United States Patent
Taguchi et al.

(10) Patent No.: US 9,264,635 B2
(45) Date of Patent: Feb. 16, 2016

(54) IMAGE PROCESSING APPARATUS, IMAGE PROCESSING METHOD, AND IMAGING APPARATUS

(71) Applicant: Kabushiki Kaisha Toshiba, Tokyo (JP)

(72) Inventors: Yasunori Taguchi, Kawasaki (JP); Toshimitsu Kaneko, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 24 days.

(21) Appl. No.: 14/136,880

(22) Filed: Dec. 20, 2013

(65) Prior Publication Data

US 2014/0176760 A1    Jun. 26, 2014

(30) Foreign Application Priority Data

Dec. 25, 2012  (JP) ................ 2012-280883

(51) Int. Cl.
*H04N 5/357* (2011.01)
*G06T 5/00* (2006.01)
*G06T 5/20* (2006.01)
*H04N 9/04* (2006.01)

(52) U.S. Cl.
CPC .............. *H04N 5/3572* (2013.01); *G06T 5/002* (2013.01); *G06T 5/20* (2013.01); *H04N 9/045* (2013.01); *G06T 2207/10024* (2013.01); *G06T 2207/20012* (2013.01); *G06T 2207/20081* (2013.01); *H04N 2209/046* (2013.01)

(58) Field of Classification Search
CPC ..... H04N 9/735; H04N 9/045; H04N 5/3572; H04N 2209/046; G06T 5/00; G06T 5/002; G06T 5/20; G06T 2207/20081; G06T 2207/20012; G06T 2207/10024
See application file for complete search history.

(56) References Cited

U.S. PATENT DOCUMENTS

| | | | |
|---|---|---|---|
| 4,876,602 A * | 10/1989 | Zwirn et al. | 348/625 |
| 5,241,372 A * | 8/1993 | Ohba | 348/578 |
| 7,595,819 B2 | 9/2009 | Kondo | |
| 2003/0086007 A1* | 5/2003 | Sasai | 348/240.2 |
| 2004/0051799 A1* | 3/2004 | Yamanaka | 348/272 |
| 2011/0228343 A1 | 9/2011 | Isogawa et al. | |
| 2012/0069237 A1* | 3/2012 | Kishine | 348/336 |
| 2012/0307116 A1* | 12/2012 | Lansel et al. | 348/273 |

FOREIGN PATENT DOCUMENTS

| | | |
|---|---|---|
| JP | 4281453 | 3/2009 |
| JP | 4945532 | 3/2012 |
| JP | 4956464 | 3/2012 |

\* cited by examiner

*Primary Examiner* — Luong T Nguyen
(74) *Attorney, Agent, or Firm* — Finnegan, Henderson, Farabow, Garrett & Dunner, L.L.P.

(57) ABSTRACT

According to an image processing apparatus includes an acquisition unit, a storage unit, and a convolution unit. The acquisition unit is configured to acquire an input image captured via an optical system. The storage unit is configured to store therein a coefficient designed through learning for each of positions of respective pixel sets referred to in a convolution such that a result of the convolution of a second image with the coefficient is brought nearer to a first image, the second image being obtained by deteriorating the first image through a predetermined deterioration process. The convolution unit is configured to read the coefficient from the storage unit correspondingly to a position of a pixel set referred to in the input image, and generate an output image by convoluting the pixel set with the coefficient.

19 Claims, 11 Drawing Sheets

FIG.3

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

| R | G | R | G | R | G | R | G |
|---|---|---|---|---|---|---|---|
| W | B | W | B | W | B | W | B |
| R | G | R | G | R | G | R | G |
| W | B | W | B | W | B | W | B |
| R | G | R | G | R | G | R | G |
| W | B | W | B | W | B | W | B |

1301

$$F_i = \arg\min_{F} \sum_{n=1}^{N} \|Fz_{i,n} - x_{i,n}\|^2$$
$$= \left(\sum_{n=1}^{N} x_{i,n} z_{i,n}^T\right)\left(\sum_{n=1}^{N} z_{i,n} z_{i,n}^T\right)^{-1}$$

i: INDEX RELATED TO POSITION

US 9,264,635 B2

IMAGE PROCESSING APPARATUS, IMAGE PROCESSING METHOD, AND IMAGING APPARATUS

CROSS-REFERENCE TO RELATED APPLICATION

This application is based upon and claims the benefit of priority from Japanese Patent Application No. 2012-280883, filed on Dec. 25, 2012; the entire contents of which are incorporated herein by reference.

FIELD

Embodiments described herein relate generally to an image processing apparatus, an image processing method, and an imaging apparatus.

BACKGROUND

As a technique for improving the quality of images captured by image capturing devices, the following technique disclosed in Japanese Patent No. 4281453 is known. Each pixel in an input image is classified into any of a plurality of classes based on the image pattern of a block including the pixel, and the block is convolved with a coefficient learned from the class of pixels thus classified. Through this process, the image quality is improved correspondingly to the image pattern of the block.

Because pixels in an image captured by an image capturing device deteriorate differently depending on the position of the pixel, it has been difficult to improve an image quality using such a process that is based on the image pattern of a block.

BRIEF DESCRIPTION OF THE DRAWINGS

FIG. 3 is a schematic diagram of an example of a color filter array using the Bayer pattern;

FIG. 9 is a schematic diagram of an example of a pixel set in a case in which pixels corresponding to B-color filters are used as representative pixels;

FIG. 10 is a schematic diagram of an example of a pixel set in a case in which pixels corresponding to G-color filters are used as representative pixels;

DETAILED DESCRIPTION

According to an image processing apparatus includes an acquisition unit, a storage unit, and a convolution unit. The acquisition unit is configured to acquire an input image captured via an optical system. The storage unit is configured to store therein a coefficient set designed through learning for each of positions of respective pixel sets referred to in a convolution such that a result of the convolution referring to a second image with the coefficient set is brought nearer to a first image, for which the second image is obtained by deteriorating the first image through a specific deterioration process. The convolution unit is configured to read the coefficient from the storage unit correspondingly to a position of a target pixel set referred to in the input image, and generate an output image by convoluting the target pixel set with the coefficient set.

First Embodiment

Figures 1, 2:
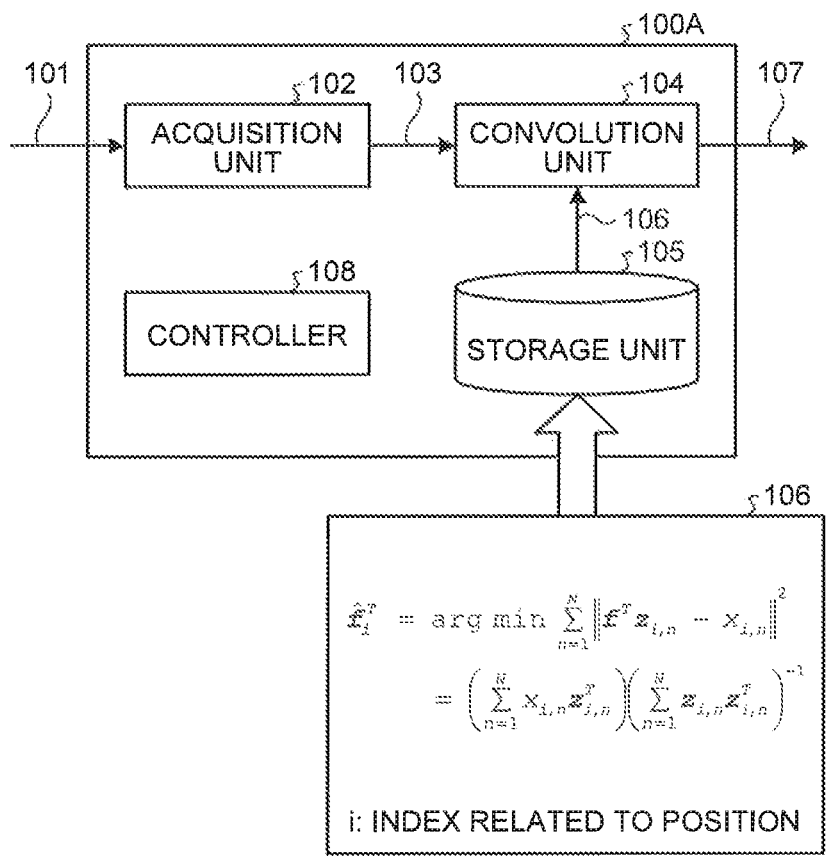
FIG. 1 is a block diagram illustrating an exemplary configuration of an image processing apparatus according to a first embodiment.
FIG. 2 is a schematic diagram of an example of a Bayer pattern.

An image processing apparatus according to a first embodiment will now be explained. FIG. 1 illustrates an exemplary configuration of an image processing apparatus 100A according to the first embodiment. The image processing apparatus 100A according to the first embodiment includes an acquisition unit 102, a convolution unit 104, a storage unit 105, and a controller 108. The controller 108 includes a central processor (CPU), a random access memory (RAM), and a read-only memory (ROM), for example, and controls the entire operation of the image processing apparatus 100A following a computer program stored in the ROM in advance, and using the RAM as a working memory.

The acquisition unit 102 and the convolution unit 104 in the image processing apparatus 100A may be implemented using pieces of hardware working with one another, or a part or the whole of the acquisition unit 102 and the convolution unit 104 may be realized as a computer program operating on the CPU. When the acquisition unit 102 and the convolution unit 104 are implemented as a computer program, the computer program may be executed on the same CPU on which the controller 108 operates.

In the image processing apparatus 100A, the acquisition unit 102 acquires an input image 101, and outputs a pixel set 103 that is a set of pixels in which each pixel in the input image 101 serves as a representative pixel. The storage unit 105 retains a coefficient set 106, details of which will be described later, calculated correspondingly to each of the pixels in the input image 101. The convolution unit 104 reads the coefficient set 106 corresponding to the representative pixel in the pixel set 103 from the storage unit 105, convolves the pixel set 103 with the coefficient set 106, to acquire an output image 107.

In such a configuration, the input image 101 imaged and captured via an optical system is input to the image processing apparatus 100A. The image processing apparatus 100A generates and outputs an output image 107, which is the input image 101 having its image quality improved based on the coefficient set 106 retained in the storage unit 105.

To begin with, the input image 101 will be explained. The light from a subject passes through an optical system including a lens system and color filters, is incident on the image capturing device, and is output from the image capturing device as an input image 101 having pixel signals corresponding to the respective pixels of the image capturing device. As the image capturing device, a charge coupled device (CCD) image sensor or a complementary metal oxide semiconductor (CMOS) image sensor may be used.

A camera using an optical system including a lens has less shot noise than a pinhole camera because the amount of light incident on the image capturing device is larger than that in a pinhole camera. In addition, an optical system including color filters can achieve a color image as an input image 101. Moreover, a single-sensor optical system, in which a plurality of color filters corresponding to a plurality of colors are arranged on the light receiving surface of a single image capturing device, can be manufactured at a lower cost than a three-sensor optical system, in which one image capturing device is provided for each of the colors. Therefore, digital still cameras and digital video cameras often use a single-sensor optical system including a lens system and a color filter array.

A color filter array is configured as a unit color filter array arranged repetitively in a specific pattern, whereas the unit color filter array is configured as a specific pattern of color filters of respective colors serving as the basis for generating a color image. FIG. 2 illustrates an example of a Bayer pattern, which is an example of a unit color filter array. A Bayer pattern is a pattern in which one red (R) color filter, one blue (B) color filter, and two green (G) color filters are arranged in a matrix, in such a manner that filters of the same color are not adjacent to each other.

FIG. 3 illustrates an example of a color filter array using the Bayer pattern as the unit color filter array. In the example illustrated in FIG. 3, the color filter array is configured as the unit color filter array arranged repetitively in a matrix, arranged in such a manner that the color filters of the same color are not adjacent to each other.

In a single-sensor optical system including a lens system and a color filter array, each pixel in the image capturing device is capable of detecting only one color corresponding to the color filter provided to the pixel. Therefore, a known process called demosaicing is applied to an output from the image capturing device, to generate an image each pixel of which has an R value, a G value, and a B value, for example.

In the description below, it is assumed that the input image 101 is an image captured via a single-sensor optical system including a lens system and a Bayer color filter array using R, G, and B primary colors. In this example, each pixel in the input image 101 has a value of one of the R color, the G color, and the B color. Hereinafter, an image output from the image capturing device without being applied with demosaicing is referred to as a raw image. Each pixel in a raw image has only one color component determined by the color filter at the position corresponding to the pixel in the color filter array. By contrast, an image each pixel of which has R, G, and B values, for example, is referred to as a full-color image. A full-color image can be achieved by applying demosaicing to a raw image, for example. The first embodiment is not limited to the example described above.

Figure 4:
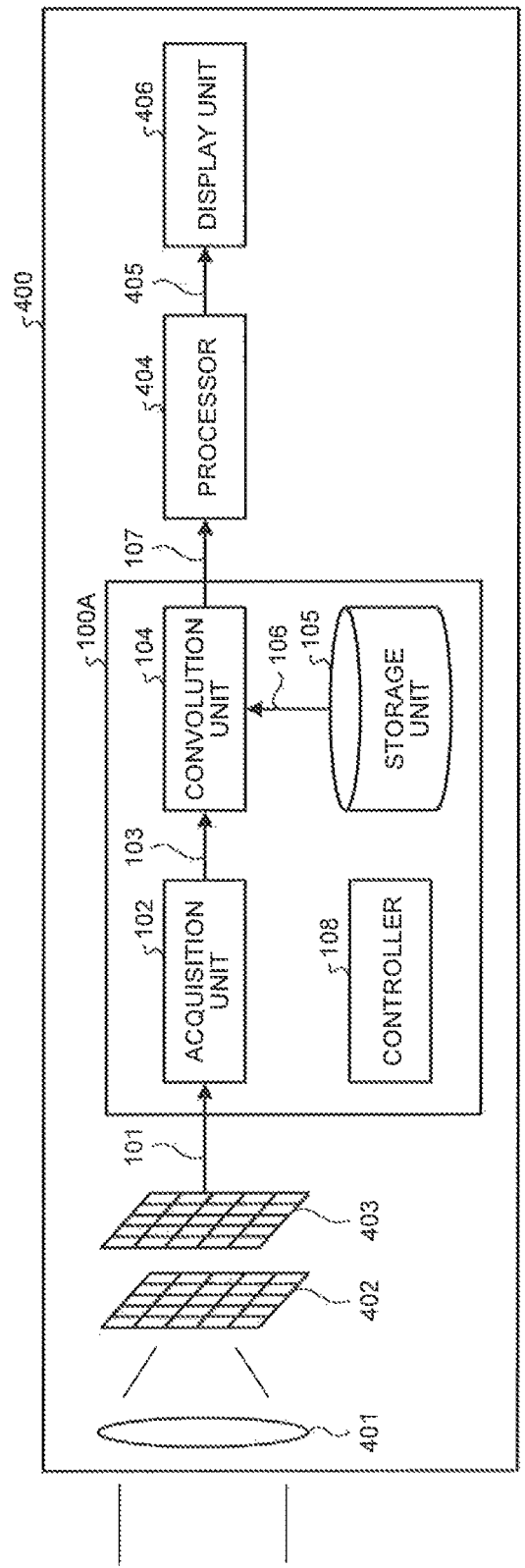
FIG. 4 is a block diagram illustrating an exemplary configuration of a digital camera incorporated with the image processing apparatus according to the first embodiment.

The image processing apparatus 100A illustrated in FIG. 1 may be used in a manner incorporated into an image processor of a digital camera or a digital video camera. FIG. 4 illustrates an exemplary configuration of a digital camera 400 incorporated with the image processing apparatus 100A. In the example illustrated in FIG. 4, the digital camera 400 includes a lens group 401, a color filter array 402, an image capturing device 403, the image processing apparatus 100A, a processor 404, and a display unit 406. In FIG. 4, the parts corresponding to those in FIG. 1 are assigned with the same reference numerals, and detailed explanations thereof are omitted hereunder.

The lens group 401 includes at least one lens. The lens group 401 may also include a diaphragm mechanism, and may further include a zooming mechanism or a focusing mechanism. The color filter array 402 is a Bayer color filter array using the RGB colors, for example. A CCD is used as the image capturing device 403, for example. Light from a subject is collected by the lens group 401, and is incident on the light receiving surface of the image capturing device 403 through the color filter array 402. The image capturing device 403 performs a photoelectrical conversion of the light incident on the light receiving surface in units of a pixel, and outputs a raw image as a captured image.

The captured image output from the image capturing device 403 is input to the image processing apparatus 100A as the input image 101. In the image processing apparatus 100A illustrated in FIG. 4, the controller 108 can control operations of the lens group 401 as well as the operation of the image processing apparatus 100A. For example, when the lens group includes a zooming mechanism, an auto-focus mechanism, an auto-exposure mechanism, and the like, the controller 108 can control functions of these mechanisms based on a computer program.

The image processing apparatus 100A outputs an output image 107 that an input image 101 applied with a process which will be described later. The processor 404 applies specific image processing such as γ conversion to the output image 107 received from the image processing apparatus 100A, and outputs an image 405 thus processed to the display unit 406. The display unit 406 includes a display device using a liquid crystal display (LCD), for example, and a driver for driving the display device, and displays the processed image 405 output from the processor 404 onto the display device. The digital camera 400 may be provided with an internal storage media such as a flash memory, or connected to such a storage medium, so that the processed image 405 output from the processor 404 can be stored in the storage medium.

In the configuration illustrated as an example in FIG. 4, an input image 101, that is, a captured image output from the image capturing device 403 has some deteriorations with respect to an ideal image, by being affected by the lens group 401, the color filter array 402, and the like. An ideal image herein means an ideal image that is virtually created from the light from a subject. Such deteriorations include distortion or blurriness caused by the lens group 401, decimation of some color components with the color filter array 402, noise introduced in the photoelectrical conversion in the image capturing device 403, interference between adjacent pixels, and shot noise that is dependent on the amount of light.

The image processing apparatus 100A generates an image in which at least one of various deteriorations caused by the lens group 401, the color filter array 402, the image capturing device 403, and the like is suppressed, as an output image 107. An output image 107 is generated in units of a pixel. Hereinafter, a pixel to be generated as a pixel of an output image 107 is referred to as a target pixel, and deteriorations caused by the lens group 401, the color filter array 402, the image capturing device 403, and the like are referred to as deteriorations caused by the optical system.

The image processing according to the first embodiment will now be explained more in detail. The image processing according to the first embodiment improves the image quality of an input image 101 having deteriorated through the optical system, and outputs the resultant image as an output image 107. The image quality improvement herein means a process of bringing an input image 101 having deteriorated nearer to the ideal image. The process performed by the image processing apparatus 100A differs depending on an input image or an ideal image assumed. Explained hereunder is an example in which an input image is a raw image captured via an optical system, and is a raw image whose ideal image is an image without any blurriness, despite such assumptions are merely an example, and the scope of each embodiment is not limited thereto.

The acquisition unit 102 divides an input image 101 into a plurality of regions. For example, as illustrated as an example in FIG. 5, the acquisition unit 102 divides an input image 101 into three in the vertical direction and into five in the horizontal direction in FIG. 5, that is, 15 regions in total. If the size of the input image 101 is 1920 pixels horizontally by 1080 pixels vertically, as an example, the size of the each region thus divided is 384 pixels horizontally by 360 pixels vertically. The acquisition unit 102 also establishes one of the pixels in the input image 101 as a representative pixel, and forms a pixel set 103 of a plurality of pixels. The pixel set 103 is generated for each of the pixels included in the input image 101.

Figure 5:
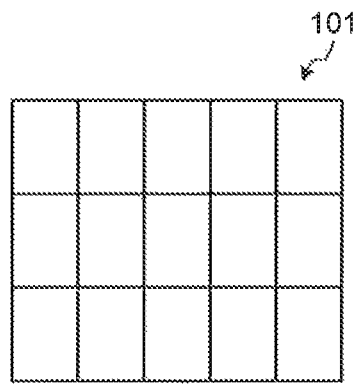
FIG. 5 is a schematic for explaining how an input image is divided into a plurality of regions.

In the example illustrated in FIG. 5, the input image 101 is vertically divided into three and horizontally divided into five, so that 15 regions are formed in total, but how the input image 101 is divided is not limited thereto. For example, the number of regions divided is not limited to 15, and the shape of the region thus divided is not limited to a rectangle. For example, if the input image 101 is distorted, each of such regions may have a shape corresponding to the distortion.

The storage unit 105 retains a coefficient set corresponding to the position of a pixel set 103. A coefficient set is retained for each of the regions of the input image 101 to which the respective representative pixels of pixel sets 103 belong and for each of the colors of the color filters corresponding to the respective representative pixels of the pixel sets 103. The representative pixel of the pixel set 103 herein is a pixel at the weighted center of the pixel set 103, for example. A region of the input image 101 to which the representative pixel of a pixel set 103 belongs and the color of a color filter at the representative pixel of the pixel set 103 are determined based on the position of the pixel set 103.

For example, when the representative pixel of the pixel set 103 is a pixel at the center of the input image 101, the pixel set 103 is considered to be included in the region at the center of the input image 101. Because the number of the regions into which the input image 101 is divided is 15 and the Bayer color filter array includes color filters of three colors, 45 different coefficient sets 106 are retained in the storage unit 105. A method for designing a coefficient set 106 will be described later.

For the acquisition unit 102, the controller 108 designates a pixel set 103 in the input image 101 input to the image processing apparatus 100A. For example, the controller 108 designates one of the pixels in the input image 101 as a representative pixel, and the acquisition unit 102 is caused to extract a plurality of pixels that are determined based on the representative pixel thus designated, as a pixel set 103. The acquisition unit 102 extracts the pixel set 103 at the position designated by the controller 108 from the input image 101, and outputs the pixel set 103 to the convolution unit 104.

The pixel set 103 is a set of 25 pixels of five pixels horizontally by five pixels vertically, as an example. The size of the pixel set 103 is not limited to five pixels horizontally by five pixels vertically. The shape of the pixel set 103 is not also limited to a rectangle.

The pixel set 103 output from the acquisition unit 102 is input to the convolution unit 104 as a pixel set referred to in a convolution. The convolution unit 104 also receives an input of a coefficient set 106 read correspondingly to the designation of the controller 108 from the storage unit 105. The convolution unit 104 convolutes the pixel set 103 with the coefficient set 106, both of which are thus input, to perform filtering of the pixel set 103 and to generate values of the target pixels in an output image 107.

The number of elements in the coefficient set 106 corresponds to the number of pixels in the pixel set 103. For example, when the pixel set 103 is a set of 25 pixels, the coefficient set 106 is a set of 25 coefficients. The position of the target pixel in the output image 107 is designated by the controller 108.

Hereinafter, a column vector in an arrangement of the values of pixels included in the pixel set 103 is represented as a vector z, and a column vector in an arrangement of elements of the coefficient set 106 is represented as a vector f. Therefore, the value of target pixel in the output image 107 can be represented as a value $f^T z$. Where the symbol "$T$" represents transposition of the vector. In the equations and the drawings, a vector is identified by a bold character.

The controller 108 controls to synchronize a target pixel, a coefficient set 106 that is to be read correspondingly to the position of the target pixel, and a pixel set 103 convoluted with the coefficient set 106. For example, the controller 108 designates the position of the target pixel sequentially from the upper left corner of the output image 107. Based on the position of the target pixel in the output image 107, a coefficient set 106 to be read from the storage unit 105 and a pixel set 103 to be convoluted with the coefficient set 106 in the convolution unit 104 are designated.

When the input image 101 is an image having its distortion already corrected, the representative pixel of the pixel set 103 is set to a pixel at the same position as the target pixel in the input image 101. When the input image 101 is not an image having its distortion corrected, the representative pixel of the pixel set 103 is set to a pixel in the input image 101 offset correspondingly to the distortion from the position corresponding to that of the target pixel. In this manner, the resultant output image 107 is an image having its distortion corrected. Alternatively, the representative pixel of the pixel set 103 may be set to a pixel at the same position as the target pixel in the input image 101 when the input image 101 is not an image having its distortion corrected. In this case as well, the resultant output image 107 is an image having its distortion corrected, although the quality of the correction is low.

Figure 6:
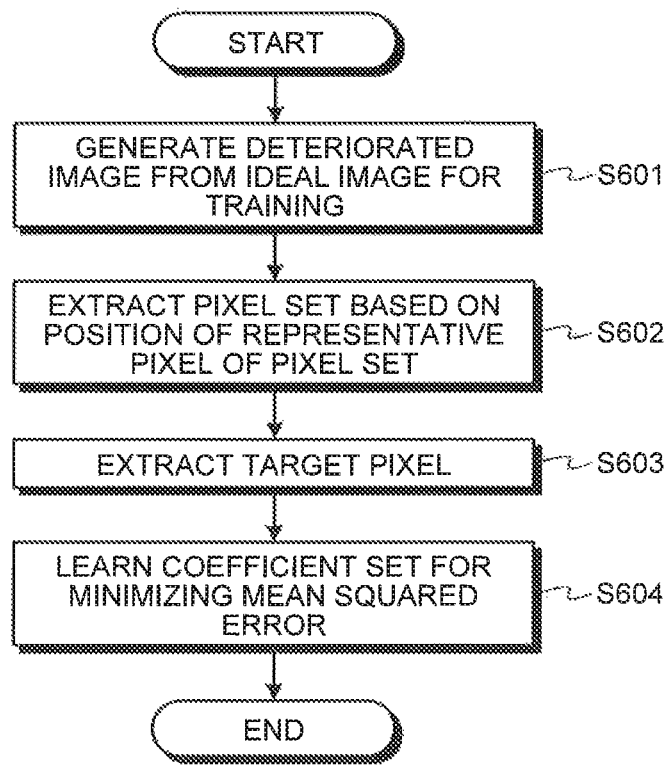
FIG. 6 is a flowchart illustrating an exemplary process of designing a coefficient set in the first embodiment.

A process of designing a coefficient set 106 will now be explained. FIG. 6 is a flowchart illustrating an exemplary process of designing a coefficient set 106 in the first embodiment. The process achieved by following the flowchart of FIG. 6 is executed by a computer external to the image processing apparatus 100A, for example.

To begin with, at Step S601, a deteriorated image that is an ideal image having deteriorated is generated by allowing an ideal image for training prepared in advance to go through a predetermined deterioration process. More specifically, generated at Step S601 is a deteriorated image that is an ideal image deteriorated by giving a blur to the image based on the deterioration process determined by the optical system. An optical simulation may be used in generating a deteriorated image. The deteriorated image corresponds to the input image 101, and the ideal image corresponds to the output image 107.

Most of the deterioration process can be expressed using a point spread function (PSF). The PSF varies depending on the position of the representative pixel of a pixel set 103 in the input image 101. A PSF can be acquired through an optical simulation. For example, in the example of the digital camera 400 illustrated in FIG. 4, the PSF is acquired by conducting an optical simulation based on the known characteristics of the lens group 401.

A PSF may be acquired for each of the divided regions of the input image 101 used as a unit for retaining a coefficient set 106, or may be acquired for each of a plurality of regions smaller than the previous regions. It is preferable for the region for which the PSF is acquired to be smaller, because a modeling error included in the deterioration process is reduced.

At the next Step S602, considering each of the pixels in the deteriorated image as a representative pixel of the pixel set 103, a pixel set corresponding to the pixel set 103 is extracted from the deteriorated image. Hereinafter, a pixel set extracted from the deteriorated image is referred to as a pixel set 103 from the deteriorated image. A column vector in an arrangement of the pixel values of the pixels in the pixel set 103 from the deteriorated image is represented as a vector $z_{i,n}$. Where the value i is an index for a coefficient set 106 that corresponds to the position of a pixel set 103 from the deteriorated image. When the number of the coefficient sets 106 is represented as a value I, the possible range of the value i is $1 \leq i \leq I$. As mentioned earlier, when the input image 101 is divided into 15 regions and three color filters are used, I=45.

In the vector $z_{i,n}$, the value n is an index for a pixel set 103 extracted from the deteriorated image correspondingly to the position of the pixel set 103 in the input image 101. When the total number of pixel sets 103 from the deteriorated image is represented as a value N, the possible range of the value n is $1 \leq n \leq N$. The value N may differ depending on the value i.

At Step S603, a pixel corresponding to the target pixel in the output image 107 is extracted from the ideal image. Hereinafter, the pixel thus extracted is also referred to as a target pixel, and the value of the target pixel is represented as $x_{i,n}$. The vector $z_{i,n}$ mentioned above corresponds to a pixel set 103 in the input image 101, and the target pixel value $x_{i,n}$ corresponds to a target pixel in the output image 107.

At Step S604, a coefficient set 106 bringing the vector $z_{i,n}$ nearest to the target pixel value $x_{i,n}$ when the vector $z_{i,n}$ is convoluted with the coefficient set 106 is learned correspondingly to the position of the representative pixel of the pixel set 103 from the deteriorated image. The coefficient set 106 acquired through the learning process is retained in the storage unit 105.

The process at Step S604 will now be explained more in detail. The row vector in an arrangement of elements of a coefficient set 106 corresponding to the representative pixel of a pixel set 103 is represented as a vector $f_i^T$. A value $f^T_i z_{i,n}$, which is the result of a multiplication of the vector $f_i^T$ and the vector $z_{i,n}$ represents a result of a convolution of the pixel set 103 from the deteriorated image with the coefficient set 106.

Acquired as the vector $f_i^T$ is one that achieves the minimum mean squared error between the target pixel value $x_{i,n}$ and the convolution result $f^T_i z_{i,n}$. In other words, the vector $f_i^T$ satisfying Equation (1) and Equation (2) is acquired.

$$f_i^T = \underset{f^T}{\operatorname{argmin}} E_i \quad (1)$$

$$E_i = \sum_{n=1}^{N} \|f^T z_{i,n} - x_{i,n}\|^2 \quad (2)$$

The value ($E_i/N$) is the mean squared error between the target pixel value $x_{i,n}$ and the value $f^T_i z_{i,n}$. The vector $f_i^T$ can be calculated by taking the derivative of Equation (2) with respect to the vector $f_T$ and equating the result to zero. If the value N is large enough, following Equation (3) is a regular matrix, and the vector $f_i^T$ can be calculated from Equation (4). The vector $f_i^T$ thus calculated is retained in the storage unit 105 as a coefficient set 106 corresponding to the position of a pixel set 103. Equation (5) represents the coefficient sets 106 retained in the storage unit 105 more specifically. If Equation (3) is not a regular matrix, the inverse matrix in Equation (4) or Equation (5) can be replaced with a generalized inverse matrix.

$$\sum_{n=1}^{N} z_{i,n} z_{i,n}^T \quad (3)$$

$$f_i^T = \left(\sum_{n=1}^{N} x_{i,n} z_{i,n}^T\right)\left(\sum_{n=1}^{N} z_{i,n} z_{i,n}^T\right)^{-1} \quad (4)$$

$$\hat{f}_i^T = \underset{}{\operatorname{argmin}} \sum_{n=1}^{N} \|f^T z_{i,n} - x_{i,n}\|^2 \quad (5)$$

$$= \left(\sum_{n=1}^{N} x_{i,n} z_{i,n}^T\right)\left(\sum_{n=1}^{N} z_{i,n} z_{i,n}^T\right)^{-1}$$

In the description above, a value i represents the index of a coefficient set 106 corresponding to the position of a pixel set 103, but the index i is not limited thereto. For example, the learning method according to the first embodiment is still applicable when an index reflecting another criterion additional to the position of a pixel set 103 is used as the value i, in the manner described in a first modification.

The images in different pixel sets in a captured image captured via a single-sensor optical system including the lens group 401 and the Bayer color filter array 402 deteriorate differently depending on the position of the pixel sets in the captured image. Retained in the storage unit 105 in the image processing apparatus 100A according to the first embodiment is a coefficient set 106 resulting in the minimum mean square error between the ideal image for training and the image corresponding to the position of the pixel set 103 in the input image 101. Therefore, the coefficient sets suppress deteriorations of arm output image 107 generated from an unknown input image 101, and an output image 107 nearer to the ideal image of the input image 101 can be achieved.

Figure 7:
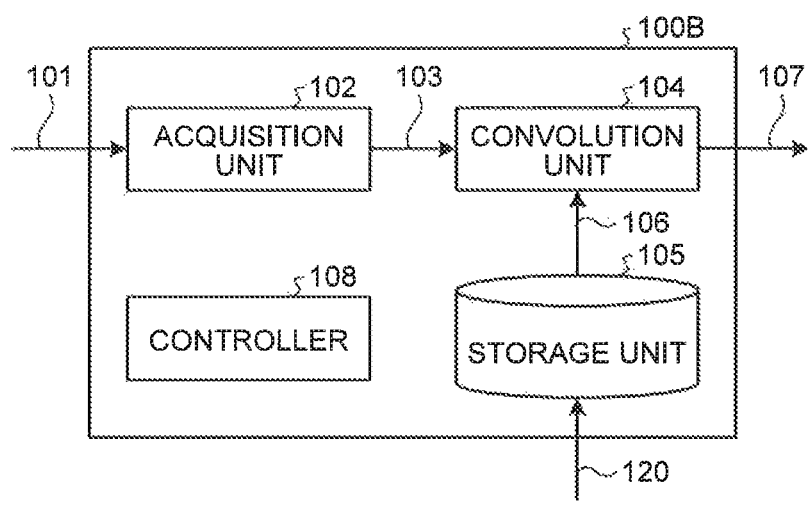
FIG. 7 is a block diagram illustrating an exemplary configuration of an image processing apparatus allowing a coefficient set retained in a storage unit to be changed externally.

In the explanation above, the coefficient sets 106 are retained in the storage unit 105 in advance in a fixed manner, but retaining of the coefficient sets 106 is not limited thereto. FIG. 7 illustrates an exemplary configuration of an image processing apparatus 100B allowing the coefficient set 106 retained in the storage unit 105 to be changed externally.

When the storage unit 105 receives a coefficient set 320 created externally to the image processing apparatus 100B, the storage unit 105 is caused to retain the coefficient set 120 as a new coefficient set 106.

When a coefficient set 106 is retained in the storage unit 105 at the time when the storage unit 105 receives the coefficient set 120, it is possible to overwrite the coefficient set 106 having been stored with the coefficient set 120 newly received. Without limitation to the overwriting, the coefficient set 120 may also be retained in the storage unit 105 in addition to the coefficient set 106 having been retained.

By allowing the coefficient set 106 retained in the storage unit 105 to be changed, even when an input image 101 input to the image processing apparatus 100B is captured under different conditions than those assumed in the coefficient set 106 already stored, such an input image 101 can be accommodated. For example, in the digital camera 400, even when the conditions such as the lens group 401, the color filter array 402, and the image capturing device 403 under which an input image 101 is captured are changed, the advantageous effects of the first embodiment can be achieved by allowing the storage unit 105 to retain the coefficient sets 120 adapted to the capturing conditions thus changed.

First Modification of First Embodiment

In the first embodiment described above, the pixel set 103 is a set of five pixels horizontally by five pixels vertically, that is, 25 pixels in total, but the configuration of the pixel set 103 is not limited to such an arrangement. Described in a first modification of the first embodiment is an example in which the pixel set 103 is a set of pixels whose respective color filters are of the same color. More specifically, pixels whose respective color filters are of the same color are extracted from the pixel set 103 of five pixels horizontally by five pixels vertically before a change, which is the pixel set used in the first embodiment, as a pixel set 103 after the change.

Figure 8:
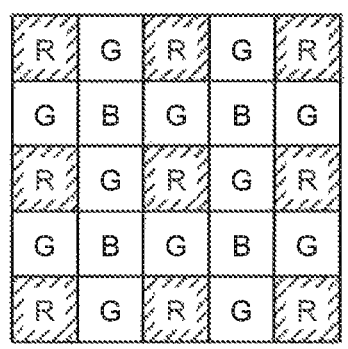
FIG. 8 is a schematic diagram of an example of a pixel set in a case in which pixels corresponding to R-color filters are used as representative pixels.
Figures 9, 10:
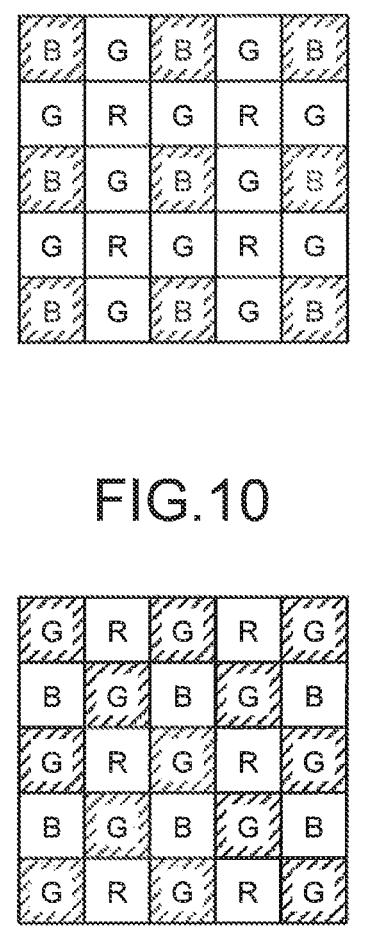

FIG. 8 illustrates an example of a pixel set 103 in a case in which pixels corresponding to the R (red) color filters (hereinafter, referred to as R-color pixels, and the same type of reference will be made for pixels of the other colors), among the RGB color filters, are used as the representative pixels. In this example, because the pixels corresponding to the R-color color filters are nine out of 25 pixels included in the pixel set 103 before the change, the number of pixels in the pixel set 103 after the change, which is an extraction of the R-color pixels, is nine. FIG. 9 illustrates an example of the pixel set 103 in a case in which the B (blue) pixels are used as the representative pixels. In this example as well, the number of pixels in the pixel set 103 after the change is nine, in the same manner as the example illustrated in FIG. 8. FIG. 10 illustrates an example of the pixel set 103 in a case in which the G (green) pixels are used as the representative pixels. In this example, there are 13 G-color pixels in the 25 pixels included in the pixel set 103 before the change, and thus the number of pixels in the pixel set 103 after the change is 13.

Regardless of which one of the R-color pixels, the G-color pixels, and the B-color pixels is used as the representative pixels, the number of pixels in the pixel set 103 after the change is smaller than that in the pixel set 103 before the change. Therefore, by using a pixel set 103, which is an extraction of pixels of a specific color, computation costs in the convolution unit 104 can be reduced. Furthermore, a storage capacity of the storage unit 105 required in storing the coefficient sets 106 can be reduced as well.

Because the refractive index of light changes depending on the wavelength of the light, a PSF varies even between the adjacent pixels, depending on the colors of color filters corresponding to the pixels. Therefore, information of pixels having the color filters of different colors does not contribute to generation of a target pixel very much, and the image quality deteriorates little even when the number of such pixels is changed. Therefore, when the first modification of the first embodiment is used, the apparatus cost can be saved efficiently.

Second Modification of First Embodiment

A second modification of the first embodiment will now be explained. In the second modification of the first embodiment, the coefficient set 106 retained in the storage unit 105 is designed by alpha-blending a coefficient set designed through learning that is based on the flowchart illustrated in FIG. 6, and another coefficient set designed through another method.

While the coefficient set learned through the method described above can be said to be optimal from the viewpoint of the smallness of the mean squared error, there are many other possible criteria for evaluating a result of learning, in addition to the mean squared error. Therefore, by performing alpha blending between the coefficient set acquired with the mean squared error and another coefficient set acquired with another evaluation criterion, a coefficient set 106 that is averagely good can be designed from the mean squared error and the other evaluation criterion.

As a method using another evaluation criterion, a method disclosed in Japanese Patent No. 4945532 may be used. However, without limitation to this method, a previous knowledge or a constraint related to the vector $f^T$ may be added to Equation (2) as an evaluation criterion, and the coefficient set 106 may be designed through learning. For example, based on a previous knowledge that the sum of the coefficients in the coefficient set 106 is one, a square of a result of subtracting one from the inner product of the vector f and a vector having only one as its components may be added to Equation (2). The term thus added functions as a constraint term for allowing the sum of the coefficients to be brought nearer one. Therefore, even when the total number N of the pixel sets 103 from the deteriorated image is small, the sum of the coefficients can be brought nearer one. Any other term related to the vector $f^T$ may be added to Equation (2). In this manner, a coefficient set 106 making the evaluation criteria thus added to be smaller can be achieved.

Third Modification of First Embodiment

A third modification of the first embodiment will now be explained. In the first embodiment, the coefficient set 106 is read from the storage unit 105 based on the position of the pixel set 103. More specifically, the coefficient set 106 is read from the storage unit 105 based on the region of the input image 101 to which the representative pixel of the pixel set 103 belongs and the color of the color filter corresponding to the representative pixel.

In the third modification of the first embodiment, a coefficient set 106 is read from the storage unit 105 based on the region of the input image 101 to which the representative pixel of the pixel set 103 belongs, the color of the color filter corresponding to the representative pixel, and the PSF modified correspondingly to the conditions of the optical system. The conditions of the optical system herein mean, in the example of the digital camera 400, for example, those accompanying the operations of a zooming mechanism or a focusing mechanism in the lens group 401. As an example, when a lens position or the like is changed as the zooming mechanism or the focusing mechanism is operated in the lens group 401, the PSF is modified correspondingly to such a change.

Therefore, in the third modification of the first embodiment, a PSF varying corresponding to a zooming operation or a focusing operation is acquired for several cases. For example, by performing an optical simulation for every typical condition of the zooming operation or the focusing operation and acquiring a PSF corresponding to such a condition, a PSF modified for each of these cases can be acquired. Therefore, in the third modification of the first embodiment, retained in the storage unit 105 are coefficient sets 106 in the number equal to the product of the number of regions into which the input image 101 is divided, the number of colors of the color filters, and the number of conditions for which a PSF is acquired.

In the first embodiment, because the number of regions into which the input image 101 is divided is 15 and the number of colors of color filters is three, 45 different coefficient sets 106 are retained in the storage unit 105. In the third modification of the first embodiment, as an example, if the number of typical conditions of the zooming operation or the focusing operation in the example described above is two, 45×2=90 different coefficient sets 106 are retained in the storage unit 105.

The method for designing coefficient sets 106 through learning is also changed because information indicating the conditions of the optical system are added to the parameters related to the selection of the coefficient set 106. Because the number of coefficient sets 106 retained in the storage unit 105 is changed from 45 according to the first embodiment to 90, the value I indicating the number of indices i of the coefficient set 106 each corresponding to the position of a pixel set 103 from the deteriorated image is changed from 45 to 90, and the possible range of the value i is changed to 1≤i≤90.

The information indicating conditional changes caused by a zooming operation or a focusing operation is input from a device external to the image processing apparatus 100A. At this time, the information classified into typical conditional changes may be input to the image processing apparatus 100A, or the controller 108 in the image processing apparatus 100A may classify the information into those corresponding to the typical cases. Based on the information indicating the typical conditional changes thus input, the controller 108 controls reading of a coefficient set 106 from the storage unit 105. In this manner, a coefficient set 106 with which the pixel set 103 is to be convoluted can be selected correspondingly to a PSF varying based on a zooming operation or a focusing operation, and the image quality of the output image 107 can be improved further.

Fourth Modification of First Embodiment

A fourth modification of the first embodiment will now be explained. The fourth modification of the first embodiment is an example in which the image processing apparatus 100A according to the first embodiment is further provided with a noise remover for removing the noise in the pixel set 103 to be input to the convolution unit 104.

Figure 11:
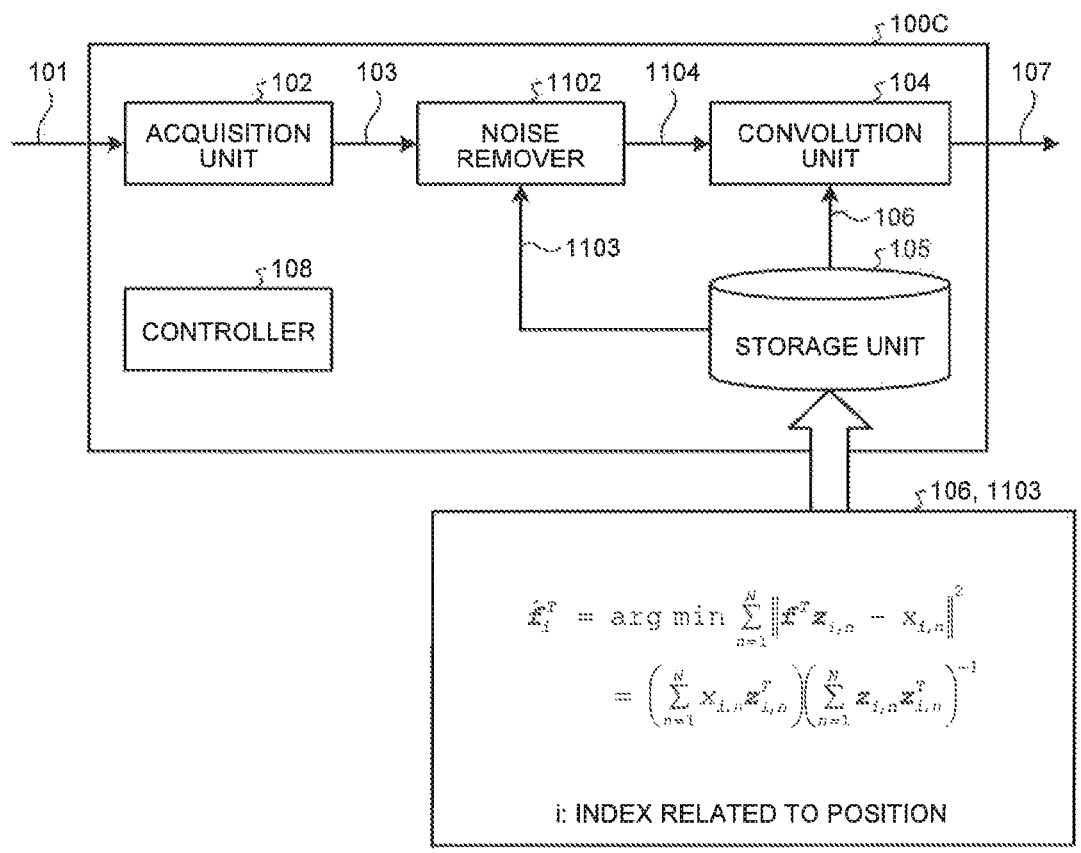
FIG. 11 is a block diagram illustrating an exemplary configuration of an image processing apparatus according to a fourth modification of the first embodiment.

FIG. 11 illustrates an exemplary configuration of an image processing apparatus 100C according to the fourth modification of the first embodiment. In FIG. 11, the parts corresponding to those in FIG. 1 are assigned with the same reference numerals, and detailed explanations thereof are omitted hereunder.

In FIG. 11, the pixel set 103 output from the acquisition unit 102 is input to a noise remover 1102. The noise remover 1102 reads a noise removing parameter 1103 designated by the controller 108 from the storage unit 105, and removes the noise included in the pixel set 103 based on the noise removing parameter 1103, to generate a pixel set 1104 having its noise removed. A noise removing method that can be applied to the noise remover 1102 is not especially limited. For example, an ε filter or a bilateral filter may be used as the noise remover 1102. The noise removing parameter 1103 determines the strength of noise removal in the noise remover 1102, for example.

The pixel set 1104 is input to the convolution unit 104. The convolution unit 104 reads a coefficient set 106 from the storage unit 105 in the same manner as in the first embodiment. The convolution unit 104 then considers the pixel set 1104 as the pixel set 103 that is input to the convolution unit 104 in the first embodiment, and generates an output image 107 by convoluting the pixel set 1104 with the coefficient set 106 read from the storage unit 105.

The noise removing parameters 1103 are prepared in advance and retained in the storage unit 105 together with the coefficient sets 106. The noise removing parameter 1103 and the coefficient set 106 are learned in such a manner that the mean squared error between an output image 107 resulting from causing the noise remover 1102 to remove the noise from the pixel set 103 extracted from the deteriorated image based on the noise removing parameter 1103 and by causing the convolution unit 104 to convolute the resultant pixel set with the coefficient set 106 and an ideal image for training, which is the source of the deteriorated image, is minimum.

More specifically, a plurality of candidates of noise removing parameters 1103 are established for the respective positions of pixel sets 103 referred when the noise is removed. Selected one of the candidate noise removing parameters 1103 is then temporarily set to the noise remover 1102.

The noise remover 1102 then removes the noise in the pixel set 103 from the deteriorated image received from the acquisition unit 102 using the noise removing parameter 1103 thus temporarily set, and outputs the resultant pixel set 2104 to the convolution unit 104. The convolution unit 104 considers the pixel set 1104 thus input as a pixel set 103 from the deteriorated image represented as the vector $z_{i,n}$ in the first embodiment, and calculates a coefficient set 106 following the process at Step S603 and Step S604 in the flowchart illustrated in FIG. 6, in the same manner as in the first embodiment. The coefficient set 106 thus calculated is optimal when the noise removing parameter 1103 thus temporarily set is used. The mean squared error between the pixel set 103 from the deteriorated image and the ideal image of the time when the coefficient set 106 is calculated is stored in a manner associated with the noise removing parameter 1103 thus temporarily set and the coefficient set 106.

The other noise removing parameters 1103 established earlier are then sequentially set to the noise remover 1102 temporarily, and corresponding coefficient sets 106 are calculated in the same manner as described above. The mean squared error between the pixel set 103 from the deteriorated image and the ideal image of the time when the coefficient set 106 is calculated is stored in a manner associated with the noise removing parameter 1103 thus temporarily set and the coefficient set 106 thus calculated.

Among the mean squared errors stored for the respective candidate noise removing parameters 1103, a pair of a noise removing parameter 1103 and a coefficient set 106 corresponding to the smallest mean squared error is retained in the storage unit 105.

By reading the noise removing parameter 1103 and the coefficient set 106 thus retained in the storage unit 105 from the storage unit 105 correspondingly to the pixel set 103 designated by the controller 108, even when input is an input image 101 including noise, a high quality output image 107 can be generated.

Explained in the fourth modification of the first embodiment is an example in which the noise removing parameter 1103 is designated by the controller 108 based on the position of the pixel set 103, but designation of the noise removing parameter 1103 is not limited thereto.

For example, the controller 108 may designate the noise removing parameter 1103 based on the average or the weighted average of the pixel values of the pixels in the pixel set 103, in addition to the position of the pixel set 103. Shot noise in the input image 101 increases as the average or the weighted average of the pixel values increases. Therefore, by designating a noise removing parameter 1103 based on the average or the weighted average of pixel values, a coefficient set 106 suitable for the shot noise can be designed.

As another example, regardless of the positions of the pixel set 103, a constant noise removing parameter 1103 may be used. In this configuration, the mean squared error between an extracted pixel set and the ideal image can be minimized in a condition that remains constant regardless of the position of the pixel set 103. In addition, the capacity of an area of the storage unit 105 for retaining the noise removing parameter 1103 can be reduced.

Furthermore, in the fourth modification of the first embodiment, the noise removing parameter 1103 retained in the storage unit 105 is designed through preliminary learning, but the noise removing parameter 1103 may be determined empirically. Even with the use of a noise removing parameter 1103 not acquired through learning, the noise remover 1102 can remove the noise in an input image 101. As a result, the image quality of the output image 107 can be improved in comparison with that according to the first embodiment.

Fifth Modification of First Embodiment

A fifth modification of the first embodiment will now be explained. In the first embodiment, the coefficient set 106 read from the storage unit 105 is switched depending on the position of the pixel set 103. In the fifth modification of the first embodiment, the coefficient set 106 read from the storage unit 105 is switched based on the result of analyzing the image pattern of the pixel set 103, in addition to the position of the pixel set 103.

Figure 12:
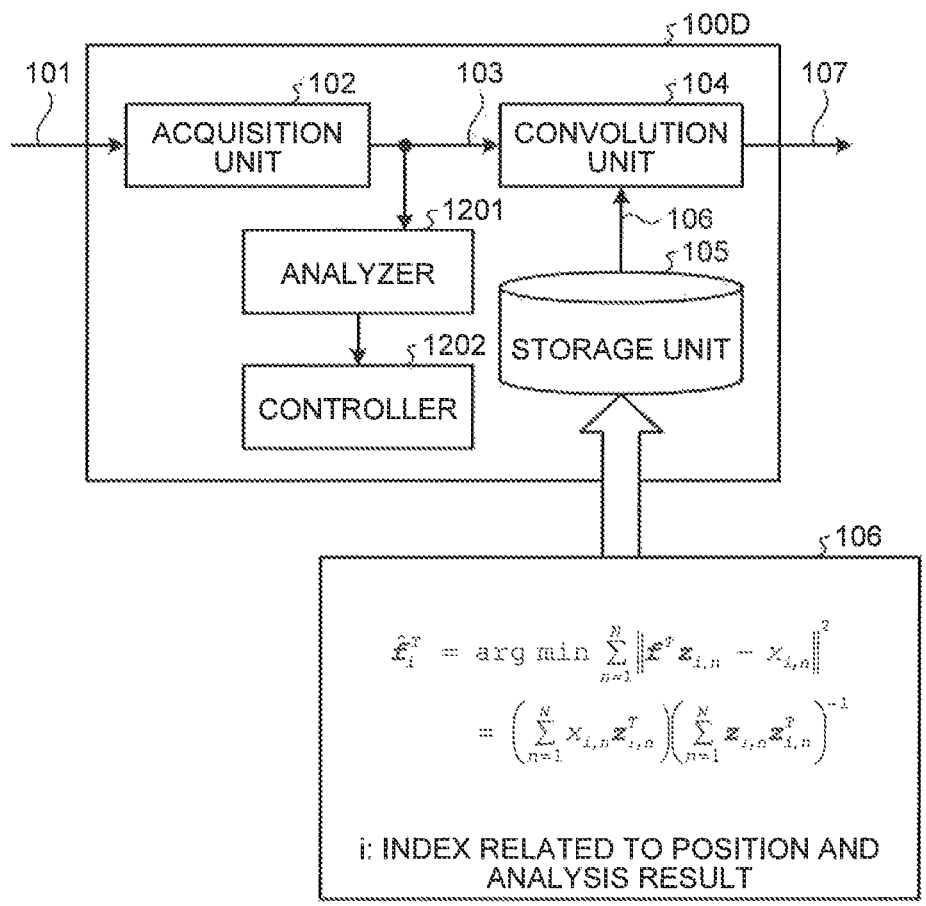
FIG. 12 is a block diagram illustrating an exemplary configuration of an image processing apparatus according to a fifth modification of the first embodiment.

FIG. 12 illustrates an exemplary configuration of an image processing apparatus 100D according to the fifth modification of the first embodiment. In FIG. 12, parts that are the same as those in FIG. 11 are assigned with the same reference numerals, and detailed explanations thereof are omitted hereunder.

In FIG. 12, an analyzer 1201 receives an input of the pixel set 103 from the acquisition unit 102, and analyses the image pattern of the pixel set 103 thus received. The analyzer 1201 then outputs the result of the image pattern analysis to a controller 1202. The analyzer 1201 analyzes the image pattern of an input pixel set 103. For example, the analyzer 1201 may acquire a characterizing quantity of the image of a pixel set 103, and classify the image of the pixel set 103 based on the characterizing quantity to one of the image patterns.

The analyzer 1201 outputs the analysis result to the controller 1202, and causes the storage unit 105 to retain the coefficient set 106 learned correspondingly to the image pattern. For example, the analyzer 1201 may analyze pixel sets 103 and determine a plurality of different image patterns that are typically found, and allow a coefficient set 106 to be designed for each of these different image patterns. As an example, if there are three different image patterns in the example explained above, 45×3=135 different coefficient sets 106 are retained in the storage unit 105.

Because information indicating an image pattern is added to the parameter related to the selection of a coefficient set 106, the method for designing the coefficient set 106 through learning is also changed. In other words, because the number of coefficient sets 106 retained in the storage unit 105 is changed to 135 from 45 in the first embodiment, for example, the value I indicating the number of indices i of the coefficient set 106 corresponding to the position of the extracted pixel set is changed from 45 to 135, and the possible range of the value i is changed to $1 \leq i \leq 135$.

The controller 1202 designates a coefficient set 106 read from the storage unit 105 based on the position of the pixel set 103 and the analysis result received from the analyzer 1201. In this manner, by applying the fifth modification of the first embodiment, the image quality of the output image 107 is improved based on the image pattern of the pixel set 103, as well as on the position of the pixel set 103.

Sixth Modification of First Embodiment

Explained in the first embodiment is an example in which a color filter array serving as a basis of the input image 101 is based on unit color filter arrays of the RGB colors arranged in the Bayer pattern, but the color filter array applicable to the each of the embodiments is not limited to the Bayer pattern, and the color filters making up the color filter array is not limited to those of the RGB colors. A sixth modification of the first embodiment is an example in which a color filter array serving as a basis of the input image 101 is not composed of RGB unit color filter arrays arranged in the Bayer pattern.

Figure 13:
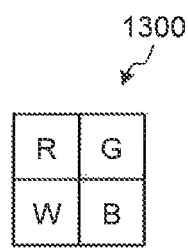
FIG. 13 is a schematic diagram of an example of a unit color filter array composed of an arrangement of color filters of RGBW four colors.
Figures 14, 15:
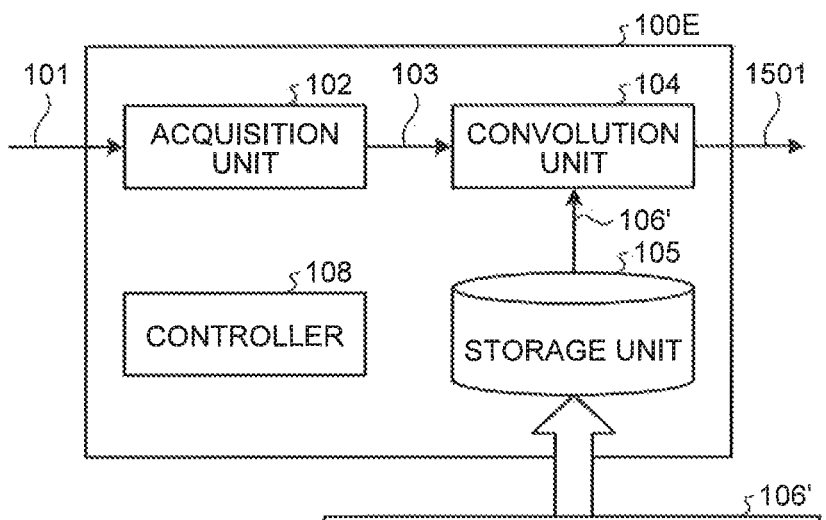
FIG. 14 is a schematic diagram of an example of a color filter array composed of an arrangement of unit color filter arrays using color filters of RGBW four colors.
FIG. 15 is a block diagram illustrating an exemplary configuration of an image processing apparatus according to a second embodiment.

A possible unit color filter array other than that of an RGB Bayer pattern is an RGBW-type unit color filter array 1300 that uses color filters of three colors of R, G, and B and no color filter for W (white color), as illustrated as an example in FIG. 13. Nothing may be installed on the parts of W (white color), or a transparent member such as a glass may be arranged instead of a color filter. Because W (white color) pixels do not have color filters, these pixels are highly sensitive, and less noise is produced even when a dark space is captured. FIG. 14 illustrates an example of a color filter array 1301 composed of an arrangement of the unit color filter arrays 1300. In this configuration, an input image 101 acquired through the color filter array 1301 is a raw image composed of R components, G components, B components, and W components.

Even when used is a color filter array 1301 whose color filter arrangement is not a Bayer pattern, the coefficient sets 106 can be learned using Equation (1) to Equation (4), in the same manner as in the first embodiment. This variation is different from the first embodiment in that the vector $z_{i,n}$, which is the column vector in an arrangement of the pixel values of the pixel set 103, includes an R component, a G component, a B component, and a W component, and in that the component of the target pixel value $x_{i,n}$ is one of the R component, the G component, the B component, and the W component.

Explained above as an example in which the unit color filter array 1300 composed of an arrangement of four color filters of R, G, B, and W (white color) is used as the unit color filter array not in the Bayer pattern, but the unit color filter array is not limited to such a configuration. For example, the sixth modification of the first embodiment may be applied in the same manner to a unit color filter array of three complementary colors of magenta, yellow, and cyan.

In the manner described above, according to the sixth modification of the first embodiment, the image quality of an output image 107 can be improved even when used in the optical system for acquiring the input image 103 is a color filter array composed of unit color filter arrays arranged in a pattern other than the Bayer pattern.

The sixth modification of the first embodiment is applicable to any image captured via any optical system including a color filter array in a repetitive arrangement of unit color filter arrays having color filters arranged in any pattern, without limitation to the color filter array having color filters arranged in the manner described above.

As an example, the optical system may include a special color filter array in which the color filters of the respective colors are not arranged repetitively in any pattern, that is, in which the color filters of the respective colors are not arranged regularly. The sixth modification of the first embodiment is also applicable to an image captured via an optical system including such a special color filter array. In such a case, the method according to the first embodiment can be applied by considering the entire special color filter array as the only unit color filter array.

Seventh Modification of First Embodiment

A seventh modification of the first embodiment will now be explained. The seventh modification of the first embodiment discloses an example in which noise is removed through the convolution of a pixel set 103 with a coefficient set 106. To explain further, in the seventh modification of the first embodiment, before generating a deteriorated image from an ideal image, a blur caused by the optical system is added to the ideal image, the ideal image thus blurred is further deteriorated by adding noise, and the image thus deteriorated is then used in learning the coefficient set 106, performed in the same manner as in the first embodiment. In this manner, when the pixel set 103 is convoluted with the coefficient set 106, a blur as well as noise can be removed simultaneously.

As a further modification of this seventh modification of the first embodiment, only noise may be removed, without removing any blur, when the pixel set 103 is convoluted with the coefficient set 106. More specifically, a deteriorated image is generated by deteriorating the ideal image for training by adding noise, but without adding any blur. A coefficient set 106 is then designed in the same manner as in the first embodiment using this pair of the ideal image and the deteriorated image, and retained in the storage unit 105. By causing the convolution unit 104 to read this coefficient set 106 thus retained in the storage unit 105 from the storage unit 105, and by convoluting the pixel set 103 with the coefficient set 106, noise in the output image 107 can be suppressed.

At this time, if intended is only to suppress noise, the coefficient set 106 does not need to be prepared correspondingly to the position of a pixel set 103 referred to in a convolution. The coefficient set 106 is designed based on the pixel value of the representative pixel in the pixel set 103 and one of the average and the weighted average of the pixel values of the pixels included in the pixel set 103, and retained in the storage unit 105.

The controller 108 then acquires the pixel value of the representative pixel, for example, from a pixel set 103 extracted from the actual input image 101, and designates a coefficient set 106 to be read from the storage unit 105 based on the pixel value thus acquired, for example. The convolution unit 104 is then caused to read the coefficient set 106 designated by the controller 108 from the storage unit 105, and convolutes the pixel set 103 with the coefficient set 106. In this manner, shot noise in the output image 107 can be suppressed efficiently.

Eighth Modification of First Embodiment

An eighth modification of the first embodiment will now be explained. In the eighth modification of the first embodiment, a coefficient set 106 is read from the storage unit 105 based on a region of the input image 101 to which the representative pixel of the pixel set 103 belongs, the color of the color filter corresponding to the representative pixel, and the amount of light received by the image capturing device outputting the input image 101.

Shot noise in an input image 101 increases when a smaller amount of light is received by the image capturing device having output the input image 101. When noise is added to the ideal image for training before generating a deteriorated image from the ideal image, it can be considered that the amount of light received by the image capturing device is known. By contrast, when an input image 101 is acquired through actual imaging, the amount of light received by the image capturing device is unknown, because the noise is already included in the input image 101. Therefore, the quality of a shot noise removal can be improved by introducing a mechanism for estimating the amount of light received by the image capturing device based on the input image 101, and selecting a coefficient set 106 with which the pixel set 103 is convoluted based on the amount of light thus estimated.

As an estimation of the amount of light received by the image capturing device, the pixel value of the representative pixel in a pixel set 103 may be used. Without limitation to the pixel value of the representative pixel, the average or the weighted average of pixel values of the pixels in the pixel set 103 may be used as the estimation. In other words, for example, one of the pixel value of the representative pixel in the pixel set 103, the average of, and the weighted average of the pixel values of pixels in the pixel set 103 is selected as an estimation of the amount of light. A coefficient set 106 is then designed for each estimation of the amount of light thus selected and for each of the positions of the pixel sets 103 to be referred to in convolution performed by the convolution unit 104, and is retained in the storage unit 105.

The controller 108 then acquires an estimation of the amount of light based on a pixel set 103 extracted from an actual input image 101, and designates a coefficient set 106 to be read from the storage unit 105 for the convolution unit 104 based on the estimation thus acquired and the position of the pixel set 103, for example. The convolution unit 104 then reads the coefficient set 106 designated by the controller 108 from the storage unit 105, and convolutes the pixel set 103 with the coefficient set 106. In this manner, the quality of the shot noise removal in the resultant output image 107 is improved.

Second Embodiment

A second embodiment will now be explained. In the first embodiment and in the modifications of the first embodiment, image quality improvements such as a blur removal and a noise removal are achieved by convoluting the input image 101 with the coefficient set 106. By contrast, in the second embodiment, demosaicing is achieved through the convolution of an input image 101 with a coefficient set.

FIG. 15 illustrates an exemplary configuration of an image processing apparatus 100E according to the second embodiment. In FIG. 15, parts that are the same as those in FIG. 1 are assigned with the same reference numerals, and detailed explanations thereof are omitted hereunder.

In the image processing apparatus 100E according to the second embodiment, a coefficient set 106' retained in the storage unit 105 is different from the coefficient set 106 retained in the storage unit 105 in the image processing apparatus 100A according to the first embodiment. While an output image 107 output from the image processing apparatus 100A according to the first embodiment is a raw image each pixel of which has the value of one of the RGB colors, the image processing apparatus 100E according to the second embodiment outputs a full-color image as an output image 1501. In a full-color image, the colors of the input image 101, which is a raw image, has been interpolated and each pixel has a value of RGB colors.

A method for designing the coefficient set 106' according to the second embodiment will now be explained in detail. A coefficient set 106' is retained in the storage unit 105 for each of the filters corresponding to the respective positions of pixel sets 103. More specifically, a coefficient set 106' is retained for each of the regions of the input image 101 to which the respective representative pixels of pixel sets 103 belong, and each of the positions of the respective representative pixels of the pixel sets 103 in the unit color filter array. The representative pixel of a pixel set 103 herein is a pixel at the weighted center of a pixel set 103, for example.

For example, when the unit color filter array is a filter array in which the RGB filter are arranged in the Bayer pattern, whose example is illustrated in FIG. 2, there are four positions in the unit color filter array. The region of the input image 101 to which the representative pixel of a pixel set 103 belongs and the color of the color filter corresponding to the representative pixel of the pixel set 103 are both determined by the position of the pixel set 103.

When the number of regions in the input image 101 is 15 and there are four positions in the unit color filter array, 60 different coefficient sets 106' are retained in the storage unit 105. The method for designing the coefficient set 106' will be explained later.

A pixel set 103 output from the acquisition unit 102 is input to the convolution unit 104. At the same time, the convolution unit 104 reads the coefficient set 106' designated by the controller 108 from the storage unit 105. The convolution unit 104 convolutes the pixel set 103 thus input with the coefficient set 106' read from the storage unit 105, to perform filtering of the pixel set 103 and to generate each of the RGB values of the target pixel in the output image 1501.

At this time, the number of elements in the coefficient set 106' will be three times the number of pixels in the pixel set 103. For example, when the pixel set 103 is a set of 25 pixels, the coefficient set 106' will be a set of 75 coefficients. The position of the target pixel in the output image 1501 is designated by the controller 108.

In the description hereunder, a column vector in an arrangement of values of the pixels in the pixel set 103 is represented as a vector z, in the same manner as the earlier description, and a matrix of three rows by 25 columns in which the elements of the coefficient set 106' are arranged is represented as a matrix F. Therefore, a three-dimensional column vector in an arrangement of the R value, the G value, and the B value of the target pixel in the output image 1501 is represented by a three-dimensional vector Fz. In the equations and the drawings, a vector is identified by a bold character. A matrix is indicated in Italic characters, in the same manner as a scalar.

A method for designing the coefficient set 106' according to the second embodiment will now be explained with reference to the flowchart in FIG. 6 mentioned earlier.

To begin with, at Step S601, an ideal image for training is prepared, and a deteriorated image that is a deterioration of the ideal image is generated by applying color decimation to the ideal image in the manner corresponding to a deterioration process determined by the color filter array, whereby causing the ideal image to deteriorate. When the unit color filter array is the Bayer color filter array illustrated in FIG. 2, how the colors are decimated is determined based on which one of the four positions the representative pixel of the pixel set 103 is positioned in the unit color filter array.

At Step S602, considering each pixel in the deteriorated image as the representative pixel of a pixel set 103, a pixel set corresponding to the pixel set 103 is extracted from the deteriorated image. Hereinafter, the pixel set extracted from the deteriorated image is referred to as a pixel set 103 from the deteriorated image. A column vector in an arrangement of the pixel values of the pixels in the pixel set 103 from the deteriorated image is represented as a vector $z_{i,n}$. In the vector $z_{i,n}$, the value i represents the index for a coefficient set 106' corresponding to the position of a pixel set 103 from the deteriorated image, and the value n represents the index for a pixel set 103 extracted from the deteriorated image correspondingly to the position of the pixel set 103 in the input image 101.

In the second embodiment, the definition of the position of a pixel set 103 is different from that in the first embodiment. In the second embodiment, the position of the representative pixel of a pixel set 103 is defined by the position of the representative pixel in the input image 101 and by the position of the representative pixel in the unit color filter array.

At Step S603, a pixel corresponding to the target pixel in the output image 1501 is extracted from the ideal image. Hereinafter, the pixel thus extracted is also referred to as a target pixel. A three-dimensional vector in which the R value, the G value, and the B value of the target pixel are arranged sequentially is represented by a vector $x_{i,n}$. In the equations and the drawings, an "x" indicating the vector is identified by a bold character. The vector $z_{i,n}$ corresponds to the pixel set 103 in the input image 101, and the vector $x_{i,n}$ corresponds to the target pixel in the output image 1501.

At Step S604, a coefficient set 106' averagely bringing the vector $z_{i,n}$ nearest to the vector $x_{i,n}$ when the vector $z_{i,n}$ is convoluted with such a coefficient set 106' is learned based on the position of the representative pixel of a pixel set 103. In this example, the position of the representative pixel of a pixel set 103 is defined by the position of the representative pixel in the input image 101 and by the position of the representative pixel in the unit color filter array illustrated in FIG. 2. The coefficient set 106' acquired through the learning is retained in the storage unit 105.

The process at Step S604 in the second embodiment will now be explained more in detail. A matrix in an arrangement of elements of the coefficient set 106' for the position of the representative pixel of the pixel set 103 is represented as a matrix $F_i$. In this example, the number of rows in the matrix $F_i$ is three correspondingly to the number of RGB colors, and the number of columns in the matrix $F_i$ is the same as the number of dimensions of the vector $z_{i,n}$.

A row vector that is an extraction of the first row in the matrix $F_i$ represents coefficients for a filter for generating an R value for the target pixel, for example. A row vector that is an extraction of the second row in the matrix $F_i$ represents coefficients for a filter for generating a G value for the target pixel, for example. In the same manner, a row vector that is an extraction of the third row in the matrix $F_i$ represents coefficients for a filter for generating a B value of the target pixel, for example. The corresponding relation between the first row, the second row, and the third row of the matrix $F_i$ to the respective RGB values is not limited to the example explained above.

A value $F_i z_{i,n}$ that is a result of multiplication between the vector matrix $F_i$ and vector $z_{i,n}$ represents the results of convolution of the pixel set 103 from the deteriorated image with the coefficient set 106'.

Acquired as the matrix $F_i$ is a matrix achieving the smallest mean squared error between the value $F_i z_{i,n}$ and the target pixel value $x_{i,n}$. In other words, a matrix $F_i$ satisfying both of Equation (6) and Equation (7) below is acquired.

$$F_i = \operatorname*{argmin}_{F} E'_i \tag{6}$$

$$E'_i = \sum_{n=1}^{N} \|F z_{i,n} - x_{i,n}\|^2 \tag{7}$$

The value ($E'_i/N$) represents the mean squared error between the value $F_i z_{i,n}$ and the target pixel value $x_{i,n}$, and such a matrix $F_i$ can be calculated by taking the derivative of Equation (7) with respect to the matrix $F_i$ and equating the result to zero. If the value N is large enough, Equation (3) mentioned above is a regular matrix, and the matrix $F_i$ can be calculated from Equation (8). The matrix $F_i$ thus calculated is retained in the storage unit 105 as a coefficient set 106' corresponding to the position of the pixel set 103. Equation (9) explains the coefficient sets 106' retained in the storage unit 105 more specifically. When Equation (3) is not a regular matrix, the inverse matrix in Equation (8) or Equation (9) can be replaced with a generalized inverse matrix.

$$F_i = \left( \sum_{n=1}^{N} x_{i,n} z_{i,n}^T \right) \left( \sum_{n=1}^{N} z_{i,n} z_{i,n}^T \right)^{-1} \tag{8}$$

$$F_i = \operatorname*{argmin}_{F^T} \sum_{n=1}^{N} \|F z_{i,n} - x_{i,n}\|^2 \tag{9}$$

$$= \left( \sum_{n=1}^{N} x_{i,n} z_{i,n}^T \right) \left( \sum_{n=1}^{N} z_{i,n} z_{i,n}^T \right)^{-1}$$

Demosaicing is achieved through this convolution process according to the second embodiment. Because this demosaicing minimizes the mean squared error between an ideal image for training and an output image, it can be expected that the square error can be averagely reduced, even when input is an unknown input image 101.

The second embodiment may also be combined with each of the modifications of the first embodiment. As an example, the second embodiment may be combined with the second modification of the first embodiment. In such an example, the coefficient set 106' is designed by alpha-blending the coefficient set designed through the method explained with reference to the flowchart in FIG. 6 in the second embodiment with another coefficient set designed using another method. In this manner, the effects of the coefficient set designed through the other method are inherited to the effects of the coefficient set 106' designed through the method according to the second embodiment. Without limitation to such alpha-blending, the coefficient set 106' may also be designed by adding another evaluation criterion to Equation (7) and conducting learning.

As another example, the second embodiment may be combined with the third modification of the first embodiment. In such an example, because the conditions of the optical system is added as a type of the coefficient set 106', the number of coefficient sets 106' retained in the storage unit 105 is increased. Therefore, a further image quality improvement can be expected.

As another example, the second embodiment may be combined with the fourth modification of the first embodiment. In this example, because a noise removal is performed in addition to the demosaicing, a further image quality improvement can be expected. As another example, the second embodiment may be combined with the fifth modification of the first embodiment. In this example, because a process is performed correspondingly to the image pattern of a pixel set 103, a further image quality improvement can be expected.

As another example, the second embodiment may be combined with the sixth modification of the first embodiment. Realized in this example is demosaicing applicable to a camera not having a color filter array composed of unit color filters arranged in the Bayer pattern, e.g., having a color filter array composed of color filters of RGBW four colors, or having a color filter array in which the color filters are arranged in another pattern. In the case of a camera having a color filter array whose unit color filter arrays are composed of an arrangement of color filters of RGBW four colors, a deteriorated image can be generated from an ideal image for training by setting an equation for generating a W value from the RGB values. In this manner, the second embodiment can be applied to such a camera. A larger amount of light is incident on the W (white color) pixels than on the pixels of any other colors among RGBW, so that white balancing can be performed at the same time.

As another example, the second embodiment may be combined with the seventh modification of the first embodiment. In this example, demosaicing and a noise removal can be executed simultaneously through the convolution.

Furthermore, in the second embodiment explained above, the storage unit 105 retains a coefficient set 106' for each of the regions of the input image 101 to which the respective representative pixels of the pixel sets 103 belong, and for each of the positions of the unit color filter array to which the respective representative pixels of the pixel sets 103 correspond, but the storage unit 105 may also retain the coefficient sets 106' for each of the positions of the unit color filter array to which the respective representative pixels of the pixel sets 103 correspond, but in a manner not associated with each of the regions of the input image 101 to which the respective representative pixels of the pixel sets 103 belong, for example, without limitation to the example mentioned above. In this manner, demosaicing can be effectively performed, while reducing the number of coefficient sets 106' retained in the storage unit 105.

Third Embodiment

A third embodiment will now be explained. In the second embodiment, demosaicing is achieved through a convolution of an input image 101 with a coefficient set. By contrast, in the third embodiment, image quality improvement and demosaicing of an input image 101 are both achieved through a convolution of the input image 101 with a coefficient set.

Figure 16:
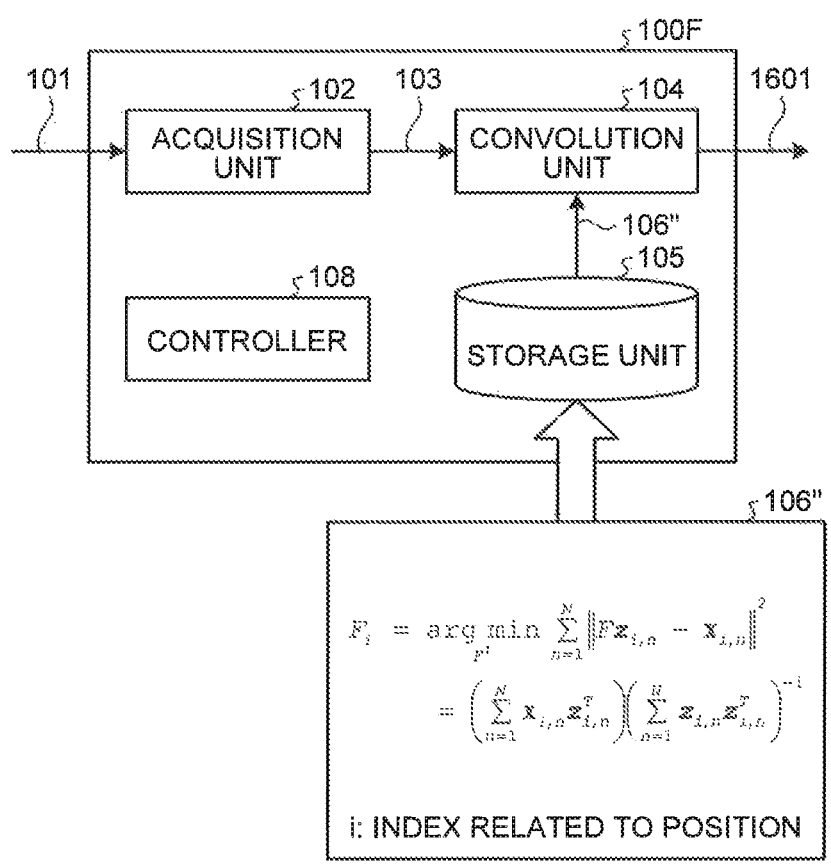
FIG. 16 is a block diagram illustrating an exemplary configuration of an image processing apparatus according to a third embodiment.

FIG. 16 illustrates an exemplary configuration of an image processing apparatus 100F according to the third embodiment. In FIG. 16, parts that are the same as those illustrated in FIG. 15 are assigned with the same reference numerals, and detailed explanations thereof are omitted hereunder. As illustrated in FIG. 16, in the image processing apparatus 100F according to the third embodiment, an output image and a coefficient set are different from those used in the image processing apparatus 100E according to the second embodiment. In the description of the third embodiment hereunder, differences with the second embodiment are mainly explained.

An output image 1601 in the third embodiment is a full-color image each pixel of which has all of the RGB values, for example, in the same manner as in an output image 1501 in the second embodiment. However, while an output image 1501 in the second embodiment is an image applied only with the demosaicing, an output image 1601 in the third embodiment is an image applied with a blur removal as well as the demosaicing.

The storage unit 105 retains a coefficient set 106" corresponding to the filter at the position of a pixel set 103. A coefficient set 106" is retained for each of the regions of the input image 101 to which the respective representative pixel of the pixel sets 103 belong, for each of the colors of color filters corresponding to the respective representative pixels of the pixel sets 103, and for each of the positions of the respective representative pixels of the pixel sets 103 in the unit color filter array. The representative pixel of a pixel set 103 herein is a pixel at the weighted center of the pixel set 103, for example.

For example, when the unit color filter array is a Bayer color filter array using RGB color filters whose example is illustrated in FIG. 2, there are four positions in the unit color filter array. The region of the input image 101 to which representative pixel of a pixel set 103 belongs, as well as the color of the color filter corresponding to the representative pixel of the pixel set 103, are determined by the position of the pixel set 103.

Because the number of regions in the input image 101 is 15, the unit color filter array in the Bayer pattern has three colors, and there are four positions in the unit color filter array, 180 different coefficient sets 106" are retained in the storage unit 105. The method for designing the coefficient sets 106" will be explained later.

In the third embodiment as well, the coefficient sets 106" retained in the storage unit 105 are designed through learning. The method for designing a coefficient set 106" according to the third embodiment will now be explained with reference to the flowchart in FIG. 6 mentioned earlier. To begin with, at Step S601, a deteriorated image that is a deterioration of an ideal image for training prepared in advance is generated by blurring the ideal image through a deterioration process determined by the optical system, and deteriorating by decimating colors.

The processes at Steps S602 and S603 are the same as those according to the second embodiment. In other words, at Step S602, considering each pixel in the deteriorated image as the representative pixel of a pixel set 103, a pixel set corresponding to the pixel set 103 is extracted from the deteriorated image (a pixel set 103 from the deteriorated pixels). A column vector in an arrangement of pixel values of the pixels in the pixel set 103 from the deteriorated image is represented as a vector $z_{i,n}$. At Step S603, a pixel corresponding to the target pixel in the output image 1601 is extracted from the ideal image. A three-dimensional vector that is a sequential arrangement of an R value, a G value, and a B value of the target pixel is represented as a vector $x_{i,n}$.

At Step S604, a coefficient set 106" averagely bringing the vector $z_{i,n}$ nearest to the vector $x_{i,n}$ when the vector $z_{i,n}$ is convoluted with such a coefficient set 106" is learned correspondingly to the position of the representative pixel of the pixel set 103, where the value i is an index for a coefficient set 106" that corresponds to the position of a pixel set 103, and value n is an index for a pixel set 103 extracted correspondingly to the position of the pixel set 103.

In the third embodiment, the definition of the position of a pixel set 103 is different from that in the second embodiment. In the third embodiment, the position of the representative pixel of the pixel set 103 is defined by the position of the representative pixel in the input image 101, the color of the color filter corresponding to the representative pixel, and the position of the representative pixel in the unit color filter array.

At Step S604, a coefficient set 106" averagely bringing the vector $z_{i,n}$ nearest to the vector $x_{i,n}$ when the vector $z_{i,n}$ is convoluted with such a coefficient set 106" is learned correspondingly to the position of the representative pixel of the pixel set 103. The method of calculating the matrix $F_i$, which is a coefficient sets 106", from the vector $z_{i,n}$ and the vector $x_{i,n}$ is the same as that in the second embodiment, and the matrix $F_i$ is calculated from Equation (6), Equation (7), and Equation (8) mentioned above. The coefficient sets 106" retained in the storage unit 105 can be expressed as Equation (9), in the same manner as the coefficient sets 106' in the second embodiment.

In the manner described above, the image processing apparatus 100 according to the third embodiment can achieve an output image 1601 that is an input image 101 applied with demosaicing and a blur removal. In the process according to the third embodiment, because the mean squared error between an ideal image for training and an output image is minimized, it can be expected that the square error can be averagely reduced, even when input is an unknown input image 101.

The third embodiment may be combined with each of the modifications of the first embodiment. As an example, the third embodiment may be combined with the second modification of the first embodiment. In this example, the coefficient sets 106" are designed by alpha-blending a coefficient set designed through the method explained in the third embodiment with reference to the flowchart in FIG. 6 with another coefficient set designed through another method. In this manner, the effects of the coefficient set designed through the other method are inherited to the effects of the coefficient set 106" designed through the method according to the third embodiment.

As another example, the third embodiment may be combined with the third modification of the first embodiment. In this example, because the conditions of the optical system are added to the coefficient set 106" and the number of coefficient sets 106" retained in the storage unit 105 is increased, a further image quality improvement can be expected.

As another example, the third embodiment may be combined with the fourth modification of the first embodiment. In this example, because a noise removal is conducted as well as demosaicing and a blur removal, a further image quality improvement can be expected. As another example, the third embodiment may be combined with the fifth modification of the first embodiment. In this example, because the processes are performed based on the image pattern of the pixel set 103, a further image quality improvement can be expected.

As another example, the third embodiment may be combined with the sixth modification of the first embodiment. Realized in this example is demosaicing and a blur removal applicable to a camera having a color filter array composed of unit color filters not arranged in the Bayer pattern, e.g., a color filter array composed of color filters of RGBW four colors, or having a color filter array using another color filter pattern.

As another example, the third embodiment may be combined with the seventh modification of the first embodiment. In this example, demosaicing, a blur removal, and a noise removal can be executed simultaneously through the convolution.

Another Embodiment

Another embodiment will now be explained. This embodiment discloses an example in which the first embodiment, the second embodiment, or the third embodiment described above is realized using a general computer device as basic hardware. Explained hereunder is an example in which the image processing apparatus 100A according to the first embodiment is implemented on a computer device.

Figure 17:
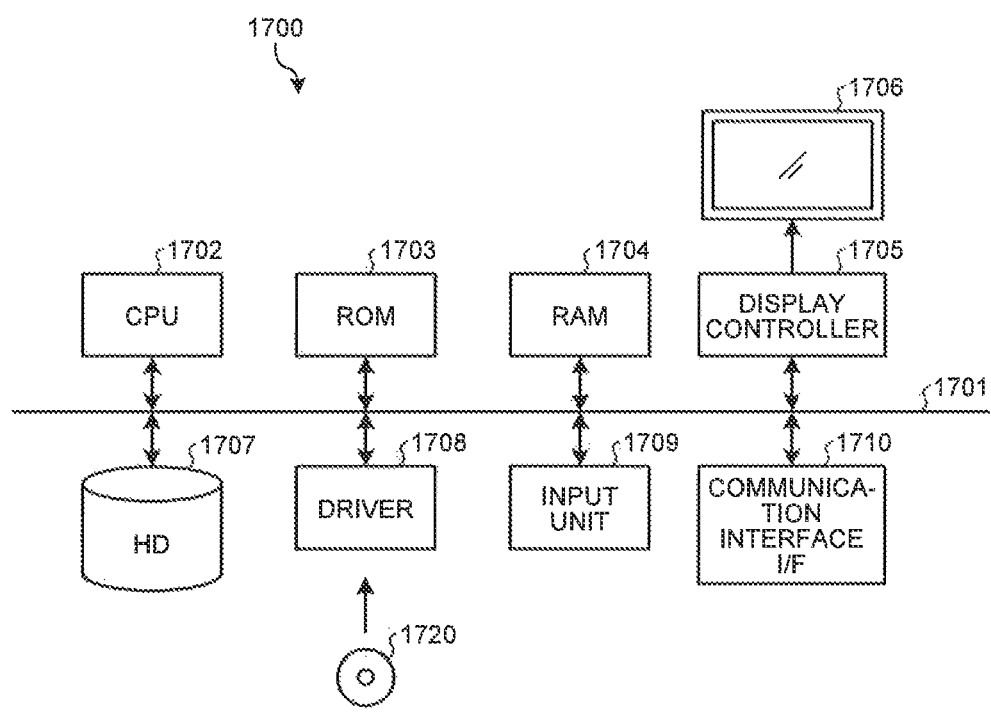
FIG. 17 is a block diagram illustrating an exemplary configuration of a computer device applicable to the image processing apparatus according to the first embodiment.

FIG. 17 illustrates an exemplary configuration of a computer device 1700 applicable to the image processing apparatus 100A according to the first embodiment. The image processing apparatus 100B to 100D according to the respective modifications of the first embodiment, the image processing apparatus 100E according to the second embodiment, and the image processing apparatus 100F according to the third embodiment may be implemented on the computer device 1700 in the same manner as the image processing apparatus 100A. Therefore, explanations thereof are omitted hereunder.

In the computer device 1700 illustrated as an example in FIG. 17, a CPU 1702, a ROM 1703, a RAM 1704, and a display controller 1705 are connected to a bus 1701. A hard disk (HD) 1707, a driver 1708, an input unit 1709, and a communication interface (I/F) 1710 are also connected to the bus 1701.

The CPU 1702 controls the entire computer device 1700 based on a computer program stored in the ROM 1703 and the HD 1707 as computer program products, using the PAM 1704 as a working memory. The display controller 1705 converts a display control signal generated by the CPU 1702 into a signal that can be displayed on a display device 1706, and outputs the signal to the display device 1706.

In the HD 1707, computer programs executed by the CPU 1702 and image data serving as an input image 101 and other data are stored. On the driver 1708, a removable storage medium 1720 can be mounted. The driver 1708 is capable of reading data from or writing data to the storage medium 1720. Examples of a storage medium 1720 that can be handled by the driver 1708 include a disk storage medium such as a compact disk (CD) or a digital versatile disk (DVD), and a non-volatile semiconductor memory.

The input unit 1709 receives inputs of data from an external device. For example, the input unit 1709 has a specific interface such as a universal serial bus (USB) or an Institute of Electrical and Electronics Engineers (IEEE) 1394, and receives data inputs from an external device via the interface. The image data serving as an input image 101 may be input via the input unit 1709.

Input devices such as a keyboard and a mouse are connected to the input unit 1709. A user can give instructions to the computer device 1700 by operating these input devices based on a screen displayed on the display device 1706, for example.

The communication I/F 1710 communicates with an external communication network over specific protocols. The image data serving as an input image 101 may be supplied from an external communication network via the communication I/F 1710.

The acquisition unit 102, the convolution unit 104, and the controller 108 described above are realized by an image processing program operating on the CPU 1702. The storage unit 105 is realized by the HD 1707 or the RAM 1704.

The coefficient sets 106, 106', and 106" used in the image processing according to each of the embodiments and each of the modifications thereof are created in advance on another computer device, and provided in a manner recorded in a computer-readable storage medium 1720 such as a CD or a DVD as a file in an installable or executable format. Without limitation thereto, the coefficient sets 106, 106', and 106" may be created on the computer device 1700, and stored in the HD 1707, the RAM 1704, or the ROM 1703.

Furthermore, the coefficient sets 106, 106', and 106" used in the image processing according to each of the embodiments and each of the modifications thereof may be stored in a computer connected to a communication network such as the Internet, and may be made available for download over the communication network. Furthermore, the coefficient sets 106, 106', and 106" used in the image processing according to each of the embodiments and each of the modifications thereof may be provided or distributed over a communication network such as the Internet.

Furthermore, the image processing program for executing the image processing according to each of the embodiments and each of the modifications thereof is provided in a manner recorded in a computer-readable storage medium 1720 as a computer program product such as a CD or a DVD as a file in an installable or executable format. Without limitation thereto, the image processing program may be provided in a manner stored in the ROM 1703 in advance.

Furthermore, the image processing program for executing the image processing according to each of the embodiments and each of the modifications thereof may be stored in a computer connected to a communication network such as the Internet, and may be made available for download over the communication network. Furthermore, the image processing program for executing the image processing according to each of the embodiments and each of the modifications thereof may be provided or distributed over a communication network such as the Internet.

The image processing program for executing the image processing according to each of the embodiments and each of the modifications thereof has a modular structure including the units described above (the acquisition unit 102, the convolution unit 104, and the controller 108), for example. As actual hardware, for example, by causing the CPU 1702 to read the image processing program from the HD 1707, for example, and to execute the image processing program, each of these units is loaded onto the main memory (e.g., the RAM 1704), and generated on the main memory.

The image processing apparatus 100A to 100F according to each of the embodiments and each of the modification thereof may be used as an image processor of a device including an image capturing device such as a single-lens reflex camera, a compact digital camera, a mobile phone, a mobile terminal, a personal computer, or a video phone. The image processing apparatus 100A to 100F according to each of the embodiments and each of the modifications thereof may be integrated with an image capturing device. Alternatively, the image processing apparatus 100A to 100F according to each of the embodiments and each of the modifications thereof may be used in a manner connected to an image capturing device. Furthermore, when the image processing apparatus 100A to 100F according to each of the embodiments and each of the modifications thereof is connected externally to an image capturing device, the image capturing device may be connected to a computer, and be implemented as software operating on the computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a storage that stores a coefficient set designed through learning for each position of pixel sets referred to in a convolution such that a result of the convolution referring to a second image with the coefficient set is brought nearer to a first image, the second image being obtained by deteriorating the first image through a specific deterioration process; and
a processor programmed to:
acquire an input image captured via an optical system including a color filter array made UP from at least one unit color filter array;
divide the input image into a plurality of regions; and
perform the convolution by:
determining a position of a target pixel set in the input image based on a region of the plurality of regions that is associated with a target pixel, a location within the at least one unit color filter array and associated with the target pixel set, and one or more colors associated with the at least one unit color filter array,
reading the coefficient set from the storage corresponding to the determined position of the target pixel set, and
generating an output image by convoluting the target pixel set with the coefficient set.

2. The apparatus according to claim 1, wherein:
the storage stores the coefficient set for each of the positions of the respective pixel sets referred to in the convolution and for each condition of the optical system; and
the processor is further programmed to perform the convolution by:
reading the coefficient set from the storage corresponding to the each condition of the optical system, and
convoluting the target pixel set with the coefficient set.

3. The apparatus according to claim 1, wherein the processor is further programmed to perform the convolution by referring, in the input image, to a pixel set only composed of pixels whose color filters are of a same color, the pixels corresponding to pixels to be generated by convoluting the target pixel set with the coefficient set.

4. The apparatus according to claim 1, wherein:
the processor is further programmed to analyze a pattern of a pixel set referred to in the input image;
the storage stores the coefficient set for each of the positions of the respective pixel sets referred to in the convolution and for each of patterns of the respective pixel sets; and
the processor is further programmed to perform the convolution by:
reading the coefficient set from the storage correspondingly to the position and the pattern of the target pixel set in the input image, and
convoluting the target pixel set with the coefficient set.

5. The apparatus according to claim 1, wherein:
the storage further stores at least one parameter for removing noise in the input image; and
the processor is further programmed to remove the noise from the input image using the at least one parameter read from the storage.

6. The apparatus according to claim 1, wherein:
the storage stores the coefficient set corresponding to a position of the target pixel set referred to in the convolution and corresponding to an amount of light received by an image capturing device at a position corresponding to the position of the target pixel set; and
the processor is further programmed to perform the convolution by:
reading the coefficient set from the storage corresponding to the amount of light corresponding to the position of the target pixel set, and
convoluting the target pixel set with the coefficient set.

7. The apparatus according to claim 1, wherein the input image and the output image are both raw images.

8. The apparatus according to claim 1, wherein the input image is a raw image, and the output image is a full-color image.

9. The apparatus according to claim 1, wherein the specific deterioration process is determined by an optical simulation.

10. The apparatus according to claim 1, wherein the specific deterioration process includes at least one of image distortion, blurriness in an image, decimation of a color component with a color filter array provided to the optical system, interference between adjacent pixels, and noise added to the image.

11. The apparatus according to claim 1, wherein the storage stores the coefficient set designed to reduce a mean squared error of squared errors, each of the squared errors being an error between the first image and a result of the convolution referring to the second image with the coefficient set.

12. The apparatus according to claim 1, wherein
the storage stores a combined coefficient set that is a combination of the coefficient set designed through the learning and another coefficient set.

13. The apparatus according to claim 1, wherein the storage rewrites and stores the coefficient set based on an external input.

14. The apparatus according to claim 1, wherein
the optical system includes a color filter array in a repetitive arrangement of unit color filter arrays, and
each of the unit color filter arrays is any one of a primary color filter array composed of color filters of red, green, and blue, a complementary color filter array composed of color filters of magenta, yellow, and cyan, and an RGBW color filter array composed of color filters of red, green, blue, and white.

15. The apparatus according to claim 5, wherein
the storage stores at least one parameter acquired through learning.

16. The apparatus according to claim 15, wherein
the storage stores at least one parameter acquired through learning conducted based on at least one of the position of the target pixel set referred to in the convolution and an amount of light received by an image capturing device at a position corresponding to the position of the target pixel set.

17. An image processing method comprising:

acquiring an input image captured via an optical system that includes a color filter array made up from at least one unit color filter array;

dividing the input image into a plurality of regions;

determining a position of a target pixel set in the input image based on a region of the plurality of regions that is associated with a target pixel, a location within the at least one unit color filter array and associated with the target pixel set, and one or more colors associated with the at least one unit color filter array;

reading a coefficient set corresponding to the determined position of the target pixel set from a storage that stores the coefficient set designed through learning for each of positions of respective pixel sets referred to in a convolution such that a result of the convolution referring to a second image with the coefficient set is brought nearer to a first image, the second image being obtained by deteriorating the first image through a specific deterioration process; and generating an output image by convoluting the target pixel set with the coefficient set.

18. An imaging apparatus comprising:

an image capturing device configured to convert incident light into an image;

at least one lens configured to guide light from a subject to the image capturing device;

a color filter array that includes at least one unit color filter array and provided between the image capturing device and the at least one lens;

a storage that stores a coefficient set designed through learning for each position of pixel sets referred to in a convolution such that a result of the convolution referring to a second image with the coefficient set is brought nearer to a first image, the second image being obtained by deteriorating the first image through a specific deterioration process; and a processor programmed to:
   acquire the image captured by the image capturing device as an input image;
   divide the input image into a plurality of regions; and
   perform the convolution by:
      determining a position of a target pixel set in the input image based on a region of the plurality of regions that is associated with a target pixel, a location within the at least one unit color filter array and associated with the target pixel set, and one or more colors associated with the at least one unit color filter array;
      reading the coefficient set from the storage corresponding to the position of the target pixel set, and
      generating an output image by convoluting the target pixel set with the coefficient set.

19. The apparatus according to claim 1, wherein the storage pre-stores a coefficient set designed through learning for each of the plurality of regions.

* * * * *